United States Patent [19]

Schickedanz

[11] Patent Number: 4,557,572
[45] Date of Patent: Dec. 10, 1985

[54] CAMERA

[76] Inventor: Willi Schickedanz, Langener Strasse 70, 6050 Offenbach am Main, Fed. Rep. of Germany

[21] Appl. No.: 465,255

[22] Filed: Feb. 9, 1983

Related U.S. Application Data

[63] Continuation of Ser. No. 39,759, May 17, 1979, abandoned.

[30] Foreign Application Priority Data

Jun. 12, 1978 [DE] Fed. Rep. of Germany ....... 2825764

[51] Int. Cl.$^4$ .......................... G03B 9/28; G03B 13/02
[52] U.S. Cl. ..................................... 354/219; 354/241
[58] Field of Search .................. 354/25, 31, 53, 62, 354/63, 105, 106, 166, 199–202, 219, 223–227, 241, 289; 352/139, 140, 243; 350/96.26; 355/40; 358/224

[56] References Cited

U.S. PATENT DOCUMENTS

| | | | |
|---|---|---|---|
| 3,030,852 | 4/1962 | Courtney-Pratt | 354/227 X |
| 3,068,772 | 12/1962 | MacNeille | 354/166 |
| 3,435,136 | 3/1969 | Bachmann et al. | 358/224 |
| 3,449,046 | 6/1969 | White | 355/40 |
| 3,555,987 | 2/1968 | Browning | 354/227 |
| 3,797,025 | 3/1974 | Murphy et al. | 354/105 X |
| 3,950,775 | 4/1976 | Toyama et al. | 354/289 |
| 4,017,168 | 4/1977 | Brown | 352/243 |
| 4,080,531 | 3/1978 | Stauffer | 354/25 |
| 4,089,016 | 5/1978 | Orlando | 354/202 X |
| 4,104,658 | 8/1978 | Uchiyama et al. | 354/106 |
| 4,163,148 | 7/1979 | Fritsche et al. | 350/96.26 X |

Primary Examiner—John Gonzales
Attorney, Agent, or Firm—Leydig, Voit & Mayer

[57] ABSTRACT

A camera includes means for separating an image to be photographed into in plurality of picture elements. These picture elements are transmitted by means of fiber optics or by means of opto-electrical converters to a view finder which displays the image to be photographed as a raster image. Said means for separating the image to be photographed is arranged close to the plane of a film or in a plane conjugate to the plane of a film.

11 Claims, 18 Drawing Figures

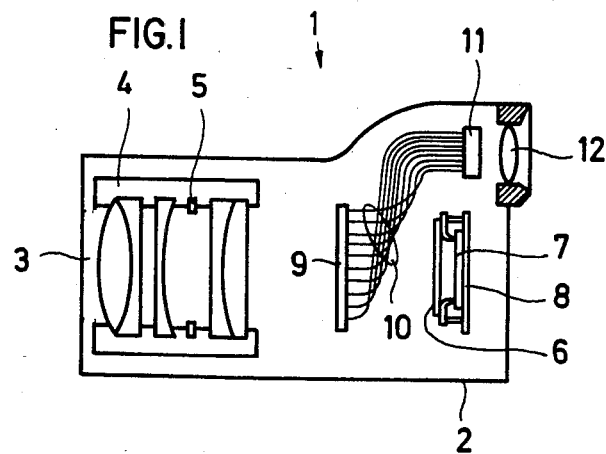
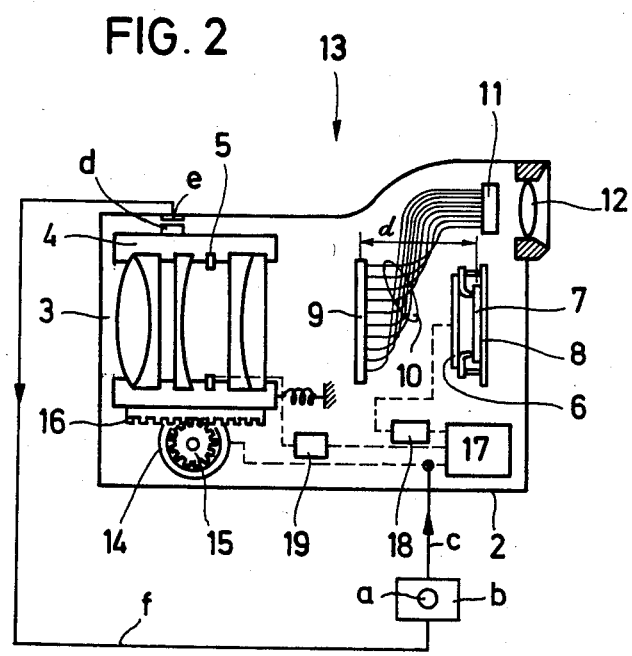

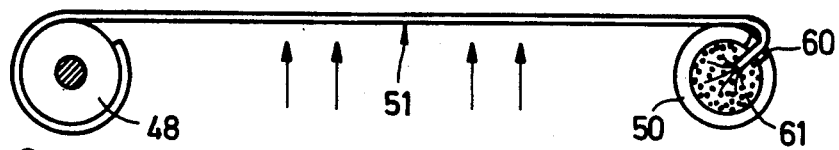
FIG. 8
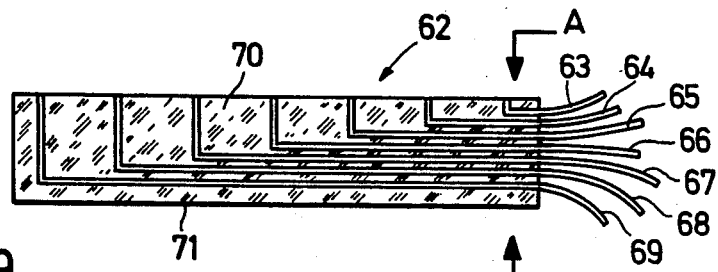
FIG. 9
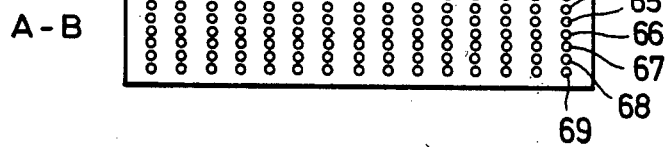
FIG. 10 A-B
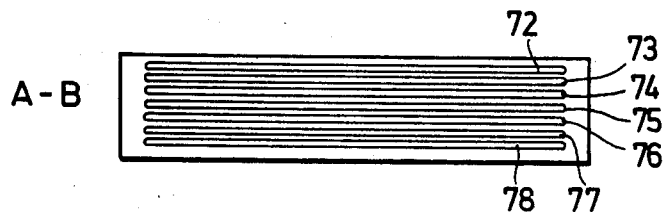
FIG. 11 A-B
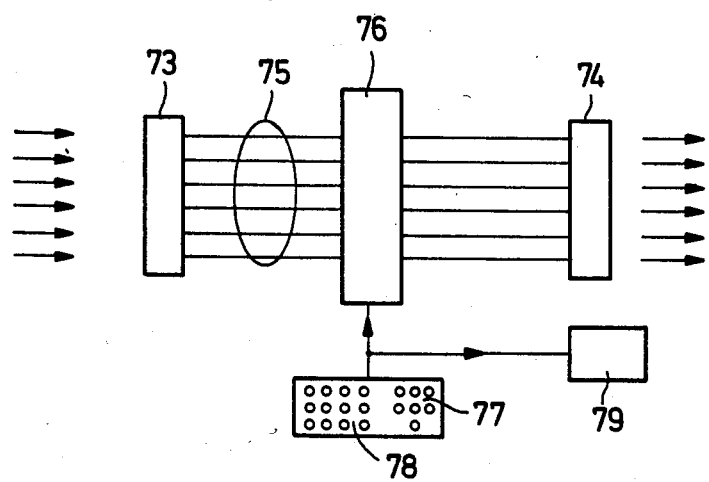
FIG. 12

CAMERA

This application is a continuation of application Ser. No. 039,759 filed May 17, 1979, abandoned.

BACKGROUND OF THE INVENTION

1. Field of the Invention

The present invention relates to a camera, and more particularly to a camera with a view finder. Still more specifically, the invention relates to a single lens camera, the view finder of which displays a true image of the objects to be photographed.

2. Description of the Prior Art

In the course of the history of photography various types of cameras have been proposed varying one from the other by the dimensions of their pictures or by their technical functions. During the previous decades those types differing by their technical functions have developed the view finder camera on the one hand and the reflex camera on the other hand as the two prominent types which both have their respective advantages and disadvantages. The view finder cameras have, as the term already indicates, a view finder through which the motive to be taken is being viewed. The viewfinder image, however, does not give any information regarding the sharp focusing and the depth of focus, as it is not identical with the picture projected on the plane of the film through the lens of the camera. Furthermore, when taking close-up views, parallax errors occur. A particularly serious drawback of the camera with a coincidence-type range finder is the fact that cameras with interchangeable lenses cannot adapt the viewing image to the different angles of the pictures, i.e. the real dimensions of the picture to be taken are not identifiable.

The disadvantages outlined above can be avoided by a reflex camera, classified into two types, i.e. the single lens and the twin lens reflex camera. The twin lens reflex camera provides two lenses co-ordinated to each other, the first of which reproduces the image to be taken on the plane of the film, whereas the other is reproducing a picture of the image on a displaying screen via a surface mirror. The drawback of the twin lens reflex camera is the comparatively high expenditure for lenses and the parallax errors still occuring when taking close-up views.

A picture without parallax errors, the dimensions of which are identical with the picture projected on the plane of the film through any type of lens, is obtainable by the aid of a single lens camera, wherein a picture is projected onto a displaying screen via a surface mirror prior to the exposure, the displaying mirror being in a conjugate plane to the image plane. The mirror mostly is arranged in front of the image plane and produces a laterally inverted picture. In order to obtain a non-reversed picture an erecting prism is arranged between the magnifying lens for the focusing screen and the focusing screen itself. During the exposure, the mirror between the lens of the camera and the plane of the film must be moved away so that the light may pass onto the plane of the film without hindrance. This moving or swinging motion of the mirror is one of the main disadvantages of the single lens reflex camera, as for each exposure the mass of the mirror has to be accelerated and afterwards decelerated. Thus, vibrations are produced and transmitted to the body of the camera which causes blurring at long exposure times. Moreover, the moving of the mirror causes disagreeable noises.

One may dispense with a movable mirror if a partly diaphanous or a beam-splitting prism or mirror is being used (see CANON-Pellix-Camera as described in German Democratic Republic Publication "Fotografie", Leipzig, 1966, No. 6, page 234). Then, however, the light transmittancy is diminished and a reduced light intensity impinges upon the plane of the film. On the other hand, a pentagonal prism is required even for a reflex camera with a still mirror, in order to get an upright picture in the view-finder of the camera.

In the technique of telephoto transmission, however, the dissolution of the picture into picture points and the transmission of the information content of those picture points instead of the transmisson of the picture as a whole has been known for long (cf. British Patent No. 241 636). With the advent of glass fibers or photoconducting fibers this transmission of picture points has been used in various technical fields, e.g. endoscopy (cf. German accepted patent application No. 1 234 920, U.S. Pat. No. 2,975,785). The transmission of colored pictures with or without phase-correction has also been proposed (cf. German published patent application No. 2 317 080; U.S. Pat. Nos. 3,020,806 and 3,449,037).

Furthermore, the advantageous use of light-conducting fibers in the technology of film projection (cf. U.S. Pat. No. 3,143,589, German Utiliy Model No. 77 34 616) as well as in the technology of television (cf. British Pat. No. 1,474,709) has also been known.

Theoretical studies on the qualities and properties of glass fiber pictures have been published by OHZU, SAWATARI and SAYANAGI ("Image Transfer Properties of Fiber Bundle", Japanese Journal of Applied Physics, Vol. 4, Suppl. 1, 1965, p. 323–328), by R. DROUGARD ("Optical Transfer Properties of Fiber Bundles", Journal of the Optical Society of America, Vol. 54, No. 7, p. 907–913) and by E. MARHIC, S. E. SCHACHAM and M. EPSTEIN ("Misalignment in imaging multifibers", Applied Optics, Nov. 1, 1978, Vol. 17, No. 21), for instance.

Finally, glass fibers have also been proposed for still picture as well as moving picture cameras in order to obtain a view finder in a remote position from the camera (cf. Swiss publication "Camera", Bern 1966, Volume 45, issue No. 8, page 52) or to obtainan upright picture in the view finder and to get a simple range finder (see U.S. Pat. No. 3,068,772). In the latter case either side of the objective of the camera comprises a bearing block which supports one end of a bundle of glass fibers arranged behind a lens with a short focal distance. The other end of such a bundle is directed towards the view finder where the ends of the two bundles combine to establish the view finder picture which may be viewed through an eyepiece. To avoid the transmission of one and the same picture by the two respective bundles of glass fibers, the left bundle may be provided for the transmission of the upper part and the right bundle for the transmission of the lower part of the view finder image to be established. Provided that the picture is in focus, both parts of the picture jointlessly coincide as in the case of a cut image range finder. By the aid of an optical system the correspondence of the picture established at the ends of the glass fiber bundles with the picture produced by the objective of the camera on the plane of the film is achieved, but not laterally inverted. If one dispenses with the distance focusing, the known device requires only one bundle of glass fibers by means of which the picture to be taken may be viewed through the view finder (loc.cit.,col. 5, lines 15-21). Although the device described above may do without a mechanical mirror in order to reproduce a picture with a comparatively small parallax in the viewfinder, and although distance measurement is comparatively easy by its aid, it still has various disadvantages. It is, for instance, annoying that the glass fiber bundles are conducted over separate bearing blocks outside the tubus of the camera. Furthermore, the view finder image is not totally devoid of parallax, as the picture projected by the photoconductive fibers is not identical to the picture projected by the objective of the camera. Finally, an additional complicated lens system is required in order to project a picture on the ends of the bundles of the light-conducting fibers in the bearing blocks.

As is known in the art, raster-like transmissions of pictures are not only limited to glass fiber bundles or the like. Instead, in television technology it is common practise to divide a picture into a plurality of elements and to transmit the optical information of each element by time-multiplexing. Of great importance with respect to cameras are opto-electrical converters not comprising any bulky vacuum tubes. Those converters are known as charge-coupled-devices (cf. German published patent application No. 27 34 409; British patent application No. 2 000 416) and MOSTET-devices (cf. British patent application, published under No. 2 001 504) or the like.

SUMMARY OF THE INVENTION

Accordingly, it is a general object of the present invention to overcome the disadvantages of the prior art.

More particularly, it is an object of the present invention to provide a new type of camera which does not have the disadvantages of the cameras known from the prior art.

Another object of the invention is to make the camera less bulky by avoiding a penta prism.

A further object of the present invention is to avoid the mirror of well-known SLR-cameras.

Another object of the invention is to make the arrangement of the view finder in the housing of the camera more flexible.

An additional object of the present invention is to use glass fiber means for displaying the picture in the view finder.

A further object of the present invention is to use electronic means for displaying the picture in the view finder.

Another object of the invention is to incorporate a shutter and diaphragm control system in a camera comprising an automatic range determining and distance adjusting device, thereby making use of the same photosensitive elements.

Another object of the invention is to provide an automatic shutter and diaphragm control which is not limited to conventional cameras, but is also applicable to cameras with electrostatic reproduction systems or to cameras making instant photographs or to cameras comprising residual light amplifiers.

An additional object of the invention is to provide a view finder which can be arranged remote from the body of the camera.

A further object of the present invention is to provide a novel view finder system for video cameras.

Another object of the invention is to combine the view finder system and the focal-plane shutter of a camera.

A further object of the present invention is to incorporate a flash unit comprising a movable reflector in the housing of a camera.

Yet a further object of the invention is to display alphanumeric symbols in the view finder.

In keeping with these objects, and with still others which will become apparent hereinafter, one feature of the invention resides in the fact that it is possible to avoid errors of parallax in the view finder without using a swinging mirror. Thus, the disagreeable rattling noise of the mirror is avoided. Furthermore, the use of an extra range finder is dispensable, as the sharpness or the unsharpness of the view finder image indicates whether or not the distance has been well-focused. An inverting prism is also dispensable, as through simply turning the bundles of light-conductors an upright picture is being produced in the view finder. Furthermore, in comparison to the known camera using light-conducting glass fibers, the invention advantageously represents a real through-the-lens-system which is, for instance, of decisive importance for self-focusing cameras using the principle of contrast, and which has allowed the sharp-focusing when using interchangeable objectives without any problems.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a diagrammatic illustration of a side view of a camera according to the present invention;

FIG. 2 is a diagrammatic illustration of a camera as shown in FIG. 1, but comprising a motor for the distance adjustment;

FIG. 8 is a top view of a focal-plane shutter according to FIG. 6;

FIG. 9 is a horizontal sectional view of the focal plane shutter as illustrated in FIG. 8;

FIG. 10 is a sectional view A-B of FIG. 9, comprising a plurality of glass fibers;

FIG. 11 is a sectional view A-B of FIG. 9, comprising a plurality og fiber glass sheets;

FIG. 12 is a diagrammatic illustration of an arrangement for displaying and writing alphanumeric information on a screen or a film, respectively;

DESCRIPTION OF THE PREFERRED EMBODIMENTS

Figure 3A:
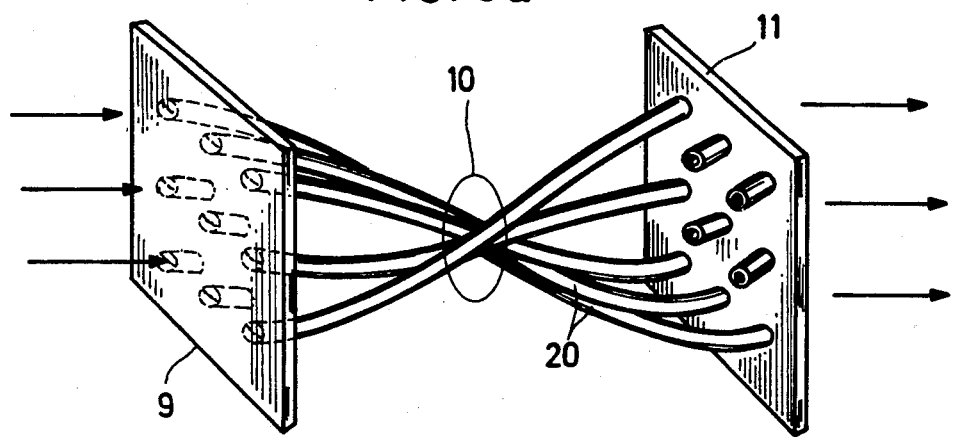
FIG. 3a is a diagrammatic illustration of the point-to-point transmission of a picture by glass fibers.

FIG. 1 is a simplified illustration of the camera 1 according to the invention in a sectional side view. This camera 1 comprises the body 2 of the camera with an objective 3 composed of several lenses in a lens mount 4. The objective 3 is advantageously interchangeable in order to allow the taking of pictures with various focal distances. In the objective 3 a diaphragm 5 is provided which may be controlled by a device not shown. Opposite the diaphragm 5 a focal-plane shutter 6 is arranged behind which the film 7 is located on a pressure plate 8. Between the objective 3 and the plane of the film a screen 9 is provided, which scans the picture projected by the objective 3 and feeds it into the device 11 via a group of circuits 10, the device 11 reproducing the scanned picture so that it can be viewed through an eyepiece 12. The screen should not, of course, essentially influence the light coming in through the objective 3. In order to avoid such an influence the screen should either be completely transparent or moved away through devices (not shown) for instance into a recess arranged vertically to the plane of illustration. Other solutions will be outlined below.

The photographer looking through an eyepiece 12 recognizes an image of the object to be photographed, which normally is blurred unless the objective 3 happens to project a well-focussed image on the plane of the screen 9. By manual adjustment of the objective 3 he may obtain a well-focused image. Thus, a threefold effect may be obtained by the screen 9, the group of conductors 10, the device 11, and the eyepiece 12: an image of high luminosity of the object to be photographed, its upright position and a range setting. If the screen 9 is mounted close to the plane of the film, the distance error may be negligible.

A camera according to the invention with a total elimination of the distance error is shown in FIG. 2. Various characteristics of this camera correspond to those of the camera shown in FIG. 1; the corresponding elements, therefore, have the same reference numerals. This camera 13 comprises an additional servo-motor 14 setting a gear 15 into motion via a rack 16; the latter is firmly connected to the lens mount. Further, a processor 17 controlling a device 18 for the actuation of the focal-plane shutter 6 as well as a device 19 for the actuation of a diaphragm 5 are provided. With the aid of the processor 17 the servo-motor 14 can also be controlled.

Looking through the eyepiece 12 at the device 11, the photographer recognizes a light, non-reversed and normally blurred image. Now he has to adjust the objective 3 until he can recognize a well-focussed image, then he can actuate the release knob. By the actuation of the release knob, however, the film 7 is by no means immediately disconnected through the focal-plane shutter 6, but the objective 3 is first being moved aside of by the servo-motor 14. This moving aside the objective is necessary for the elimination of the distance error caused through the distance d between the screen 9 and the film 7. The distance d being always invariable, the processor 17 can act upon a servo-motor 14 with a control command, causing the shifting of the objective 3 to such a distance that a well-focussed picture is being projected on the plane of the film.

When changing the objective 3 one must take into account that the change of the focal distance causes a change of the influence on the difference of images between the plane of the screen 9 and the plane of the film. In order to allow for this influence there may be provided markings on the lens mounts of the interchangeable lenses, giving information about the objective just being screwed on to the processor 17. The processor 17 will adapt its control commands for the servo-motor 14 to the respective objectives; i.e. the servo-motor will shift a tele-photo lens a different distance than a wide-angle lens.

As to the function of the processor shown in FIG. 2 (and in FIG. 7) it should be noted that most of its working operations are known in the art of aperture priority, shutter-speed priority or full program cameras (see German published patent application Nos. 25 14 230, 26 11 576, 27 38 804; Japanese published patent application No. 53-104495, public disclusure No. 54-45128, published on Apr. 10, 1979). In particular, the control signals for the movement of the motor 14 are provided in most autofocus cameras (see: Japanese Camera Trade News, December 1978, Vol. 29, No. 12, Series No. 347, front page).

In FIG. 2 a shutter release button a is shown, the pushing of which causes the device b to send a signal to the line c which indicates that the value transmitted from the processor 17 to the motor 17 is to be changed. The amount of the change or correction of this value may depend on the objective. Therefore, the objective comprises a marking d which is sensed by a sensor e. The information thusly obtained is led to the device b comprising a translator which assigns to each value on the line f a certain value on the line c. This latter value may be subtracted from the value coming from the processor 17, the difference being forwarded to the motor 14.

Figure 3B:
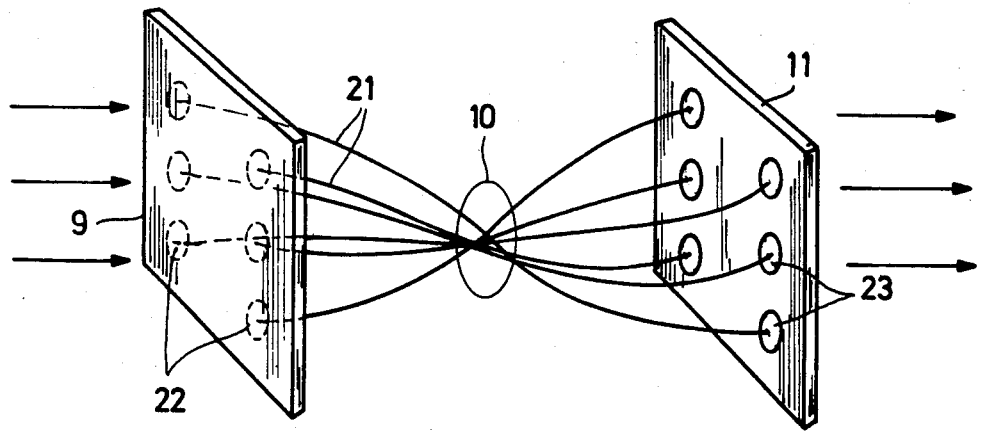
FIG. 3b is a diagrammatic illustration of a point-to-point transmission of a picture by opto-electronic and electro-optical means.

In the FIGS. 3a and 3b the known principle of the point-wise transmission of pictures is illustrated, whereby FIG. 3a demonstrates an embodiment by the aid of glass fibers, whereas FIG. 3b shows a solution with electrical transmission lines.

It should be noted, however, that the fibers in FIG. 3a can also be made of plastics or any other light-conducting material.

In FIG. 3a the screen 9—which can be interpreted as a parallel scanner, i.e. a scanner which scans all points of a picture simultaneously—is connected to the device 11 via a group of conductors 10, comprising glass fibers 20. The glass fibers are arranged in such a way that the image projected to the screen 9, being laterally inverted and upside down, appears on the device non-reversed and upright.

The disposition according to FIG. 3b essentially corresponds to the disposition of FIG. 3a, but unlike the disposition of FIG. 3a no glass fibers are provided but opto-electric converters 22 converting the impinging light signals into an analogous electrical signal and feeding them via electrical circuits 21 into an electro-optical converter 23. It goes without saying that instead of the few circuits 21 shown in FIG. 3b a considerable number of those circuits are provided in reality.

Figure 4:
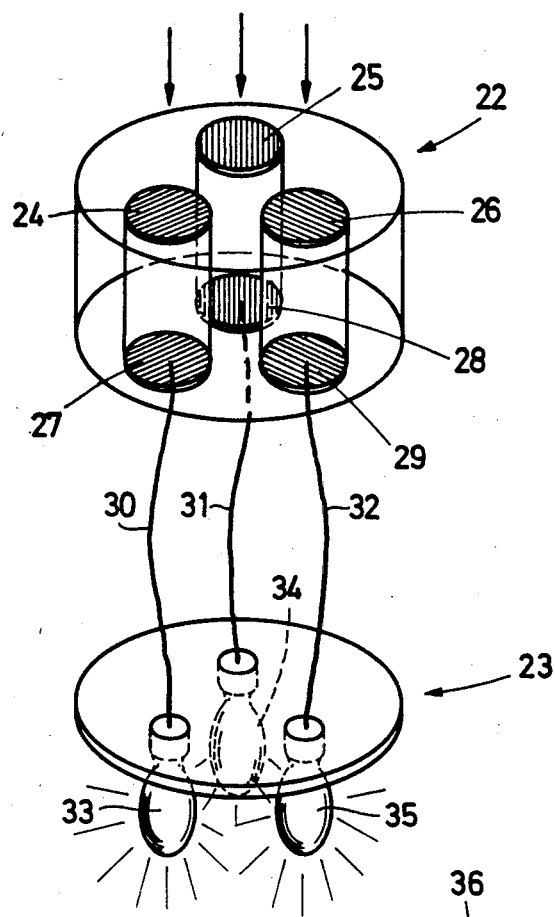
FIG. 4 is a diagrammatic illustration of opto-electronic and electro-optical means as shown in FIG. 3b which are suited for the transmission of color informations.

FIG. 4 illustrates more clearly the disposition of the opto-electrical and the electro-optical converters 22, 23. Thus, an opto-electrical converter 22 comprises three color filters 24, 25, 26 which only let pass the blue, green or red components of the impinging light. Opposite these color filters photo-sensitive elements 27, 28, 29, e.g. selenium cells, photoconductive cells or the like are arranged, which transmit an electric signal corresponding to the distinctive light intensity. The electric signals of these elements 27, 28, 29 are transmitted to the converters 33, 34, 35 via electric circuits 30, 31, 32, the converters being able to convert electric signals into a corresponding light signal. As converters 33, 34, 35 3.g. light emitting diodes may be used, the first of which is emitting red light, the second blue, and the third green light. It is, of course, possible to plan the converters 22, 23 in such a way that they also can work with the substractive color system instead of the additive color system. A chronological presentation of color impulses is also conceivable.

Figure 5:
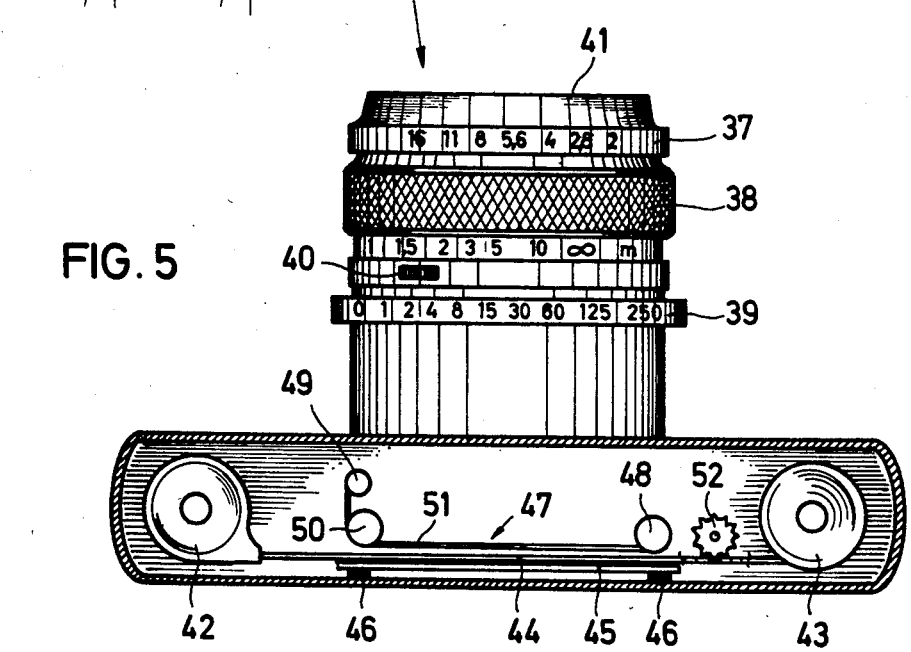
FIG. 5 is a part sectional top view of a camera, comprising a film drive and a light-receiving screen, said screen forming an integral part of a curtain of a focal-plane shutter.

FIG. 5 shows a camera 36 which is cut open in the region of the film feed. This camera 36 comprises an adjusting ring 37 for the diaphragm known in the art, an adjusting ring 38 for sharp focussing and a ring 39 for time adjustment. With the help of an unlocking key 40 the objective 41 can be exchanged.

In the region of the film feed a film pack magazine 42 is visible opposite a film take-up reel 43. Between the magazine 42 and the reel 43 the film is positioned, against which a pressure plate 45 with two springs 46 is pressing. In front of the film 44 a focal-plane shutter 47 is arranged, comprising a curtain reel 48, two spring rollers 49, 50, and curtain devices 51. According to the invention the curtain devices are designed in such a way that they not only serve for shutting and opening of the film 44 but also contain the screen 9. As photo-conductive fibers are extremely thin and flexible, they can be arranged into a layer which either itself the curtain of the focal plane shutter 47 or which is fixed on this shutter 47. The film 44 can be driven via a film drive rack 52.

Figure 6:
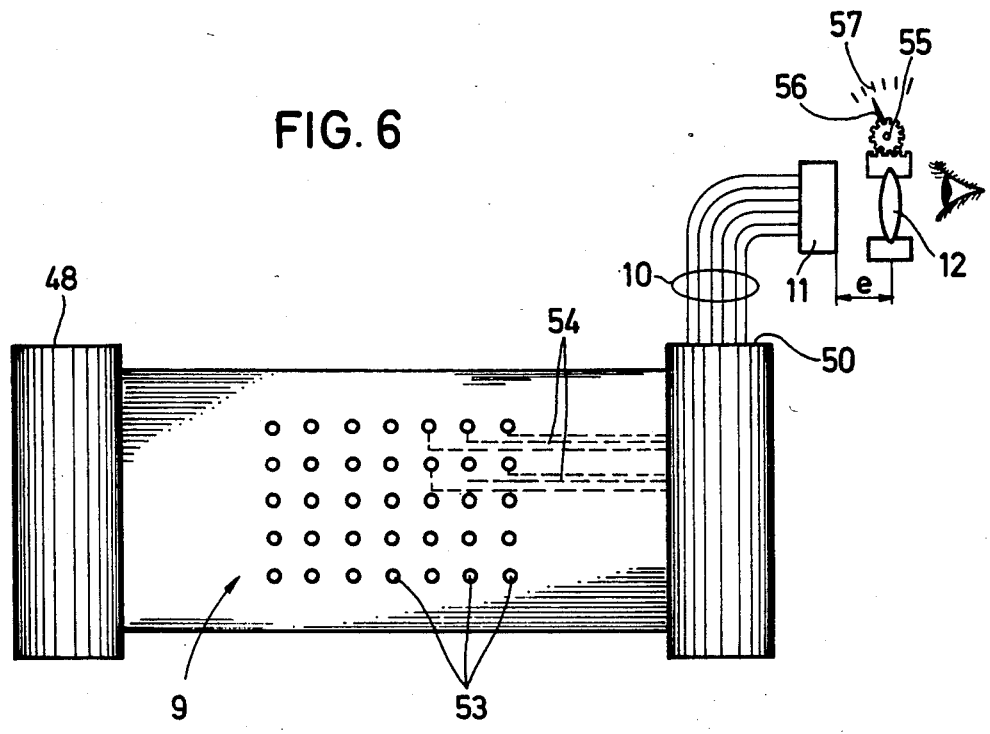
FIG. 6 is a diagrammatic illustration of a focal-plane shutter as modified according to the present invention.

FIG. 6 illustrates the curtain device 51 from the viewpoint of the objective of the camera. It is obvious that various sensors 53 are arranged in the form of a matrix, of which only a few are shown in FIG. 6 by way of example. These sensors either are the ends of photoconductive fibers as shown in FIG. 3a in connection with the screen 9 or they are opto-electric converters, corresponding to the converters 22 in FIG. 3b. From the sensors 53 conductors run to the spring roller 50; the conductors can be rolled round the roller 50 and then they extend through an internal borehole out of the roller 50. Here they form the group 10 which is fed into the device 11 in a way known in the art. In FIG. 6 the conductors 54 are drawn in broken line, as they are embedded in the inner layer of the curtain 51. They may either be continuations of the glass fibers or electric conductors passing on the signals from the converters 22.

Between the plane of the film 44 and the plane of the sensors there is a natural distance so that a sharp reproduction of a picture will not necessarily appear as sharp on the plane of the film. Because of the small distance between the two planes this error is, however, rather insignificant. But if the photographer wishes to eliminate this insignificant error, one of the abovementioned methods of correction may be applied. Moreover, another method is possible where a servo-motor is unnecessary: while pressing the release knob the lens is shifted a very small distance of correction via a mechanical drive. If one makes the mechanical drive cover different distances, the adaption is possible for all interchangeable lenses.

A much simpler method to eliminate the influence of the distance d between the two planes is to change the difference e between the eyepiece 12 and the device 11. Through a specific conception of this distance e it can be obtained that the photographer recognizes a well-focussed image only if it is well-focussed on the plane of the film. If a correction of the distance e is necessary because an objective had been exchanged before, this correction can be carried through with the aid of a set wheel 55. On this set wheel 55 an indicator 56 may be mounted which is pointing to a mark 57 indicating the focal distance of the objective for which the distance e has been adjusted so that the best possible image is being projected on the plane of the film.

In connection with the disposition of the sensors in FIG. 6 it may be of interest that the glass fibers need not be constructed as discrete fibers but can also be foils of glass fibers such as they are shown in FIG. 8, p. 649 of the journal "Applied Optics", 1978, Vol. 17, No. 4 of Feb. 15, 1978.

Figure 7:
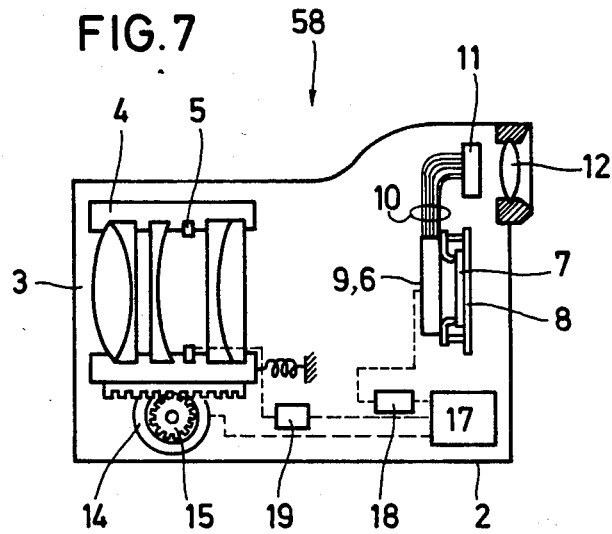
FIG. 7 is a side view of a camera corresponding to a large extent to the camera of FIG. 2, comprising in addition an auto-focus device being capable of determining the amount of movement of objects to be photographed.

FIG. 7 shows a camera 58 comprising a screen corresponding to that of FIG. 6. With that camera 58 further important functions may be realized, if the converters shown in FIG. 3b are being used. Thus, an auto-focus device may be provided as it is described in the German patent specification DE-AS No. 26 11 576. Further it is possible to detect the movement of a body to be photographed and to adapt the releasing of a shutter to the speed of the movement of the body, in order to prevent the blurring of the picture (cf. German patent specification P No. 27 38 804.1–51) The operating sequence of taking pictures is as follows: When the photographer directs the camera toward a certain object and presses the sensor plate of a release-knob known in the art (FIG. 10 of the German patent specification P No. 27 38 804.1–51), the screen is being activated. This screen registers the contrast between the different elements of the screen in interaction with the processor 17.

Corresponding to the respective contrasts the servo-motor 14 is being acted upon by a control command from the processor 17. This procedure is being repeated until a maximum contrast occurs; i.e. the best possible focus is obtained. During the automatic setting procedure the photographer can observe that the sighted object appears in the view-finder sharper and sharper, as the sensors of the screen, which feed the informations about the contrast into the processor 17, are also used for the image in the view-finder, either in a parallel operation or in a time divisional multiple method. The distance e between the screen 9 and the plane of the film can be allowed for through appropriately programming the processor 17.

If the distance of the object to be taken is well-focussed the next step is to scan the well-focused image on the screen 9 as to movements of objects in the way described in German published patent application P No. 27 38 804.1–51. If the processor detects an exposure time of 1/100 seconds to be necessary in order to obtain an unblurred picture in spite of the movement of the camera, the processor calculates the diaphragm interval corresponding to this time, the values of luminosity and sensivity of the film.

Now the diaphragm setting device 19 and the shutter speed setting device 18 are being controlled by the processor 17, and the shutter 6 and the diaphragm 5 are being released. Thus, an absolutely well-focused and correctly exposed picture can be obtained.

It goes without saying that a hybrid junction for the screen or scanning device 9 can be applied for certain purposes, i.e. glass fibers and electro-optical or opto-electrical elements can be used simultaneously. It may be useful, for instance, to use glass fibers for the optical representation of the object to be photographed in the view finder, whereas for the auto-focusing and the speed scanning electro-optical means may be more apt. The scanning device (FIG. 6) may comprise glass fiber transmitter ends and photosensitive elements in alternation.

Instead of mounting a scanning device or screen 9 on the cutain of a focal-plane shutter or instead of combining the curtain of the focal-plane shutter with the screen 9, a separate device may, of course, be provided, arranged in a conjugate plane in front of the shutter and exclusively serving to release the space between the objective 3 of the camera and the film 7 during the exposure time. Now, this device may be of simple construction, as it need not produce a slot for the exposure, i.e. it does not need two curtains. Moreover, there are no particular requirements necessary as to the capability of acceleration. The use of such a separate device seems to be convenient in the case that a camera has a central shutter (a so-called "between-the-lens-shutter") or a purely electrically controllable shutter (see: SMPTE Journal, May 1978, Volume 87, page 290, FIG. PI-8).

It is also within the scope of the invention to direct the information about the picture upwards or downwards to a scanning device, e.g. with the aid of a semi-transparent mirror mounted between the objective and the plane of the film at an angle of 45°. Although such a solution presents less advantages than the abovementioned embodiments, it is still possible to do without a penta prism and yet to obtain an image without error in the view finder.

FIG. 8 illustrates a horizontal sectional view of the device shown in FIG. 6, from above. From this figure it can be understood that a shutter device 51 is wound around the curtain wheel 48 as well as around a spring roller 50. This spring roller 50 is provided with a slot 60 and a hollow 61 for receiving the end of the curtain of the shutter device 51.

In FIG. 9 a sectional view of a screen 62 comprising glass fibers for receiving optical informations is illustrated. For the purpose of better understanding, only seven fibers 63-69 are shown, whereas a real screen may comprise about 100 000 or more fibers. The fibers 63-69 are embedded in a special substance 70, e.g. plastic or metal. At one end of the screen 62 the fibers 63-69 leave the substance 70 and may enter the hollow 61 of FIG. 8 and emerge as the bundle 10 shown in FIG. 6.

Under the screen 62 an opaque layer 71 is provided, said layer 71 preventing light from falling upon a film.

FIG. 10 is a sectional view A-B of FIG. 9, wherein the ends of the glass fibers 63-69 as well as of other glass fibers are illustrated.

A similar arrangement is shown in FIG. 11 which is a sectional view A-B of FIG. 9. However, instead of single glass fibers so-called fiber optic sheets 72-77 as described in Applied Optics, Feb. 15, 1978, page 649, FIG. 8, are used. These sheets 72-77 are arranged in the screen 62 in the same way as described in connection with FIG. 9.

In FIG. 12 a receiving-emitting device for reproducing alphanumeric data in the view finder of a camera is illustrated. For displaying such data, a liquid crystal view finder system has been proposed in the prior art, said system consisting of several layers. By using this system it is possible to display the amount of light falling upon a photometer or the like by numbers (see: German published patent application No. 26 35 786). However, the disadvantage of the prior system lies in the fact that it cannot be used for displaying objects to be photographed. The device according to FIG. 12 corresponds, in principle, to the devices as shown in FIGS. 3a and 3b, respectively, i.e. it comprises an image receiving screen 73 as well as an image displaying screen 74. The electrical lines or the optical glass fibers 75, however, are connected to a coupling device 76 which, in turn, is controlled by a controlling device 77. If, for instance, the letter "A" is to be displayed on the screen 74, a number of electrical leads or glass fibers of the bundle 75 is switched off so as to form the letter "A" point-by-point on the screen 74. Electrical switches, e.g. transistors, thyristors, tubes and the like, for doing this are well known in the art. Moreover, it is also known to switch off a light path within an optical fiber (see: German published patent application No. 22 56 785, FIG. 2 and FIG. 3; U.S. Pat. No. 4,082,435) by means of mechanical devices or by means of electro-optical devices (see: LAIKIN: "PLZT Ceramic As a High Speed Shutter", High Speed Optical Techniques, SPIE Proceedings, 94, 1976, pages 58–61; German published patent application No. 28 39 739).

For determining the letters or numbers to be displayed on the screen 74, a keyboard assembly 78 is provided which comprises configurations as, for instance, described in U.S. Pat. No. 3,860,771. Although these prior art configurations are rather adapted for numbers than for characters or letters, it is also known to use such keyboards for the input of alphanumeric data (See: Variotronic 700 device of German Pelikan Company, exhibited at Hannover Fair 1979). In the latter device the numbers as well as the letters are displayed by means of light-emitting points as it is the case with the present invention.

The above-mentioned keyboard assembly 78 can be provided, for example, at the rear end of a camera or at any other suitable place.

It is, of course, also possible to display the alphanumeric data in any area of the screen 74; e.g. in the middle of the screen or in its corners.

If a controlling device 77 having a keyboard assembly 78 is provided, it is also possible to use this device for writing alphanumeric data, e.g. the date and time when a photograph was shot, on a film, in a similar way as it has been proposed by several German published patent application (Nos. 27 51 573, 27 44 510, 27 08 300, 27 10 735, 21 22 329, 24 49 093, 26 54 259, 19 23 927, 25 05 720, 25 15 157, 26 23 690). The information transmitted by the device 77 is then received by a well-known device 79 capable of writing data on a film.

Figure 13:
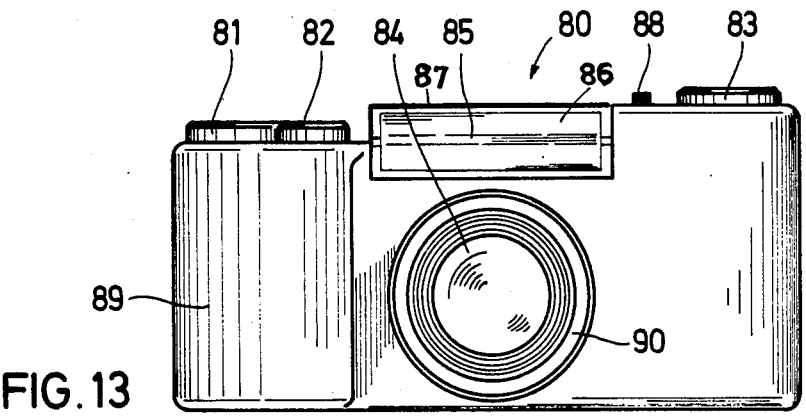
FIG. 13 is a camera comprising a turnable flash reflector.

FIG. 13 illustrates a front view of a camera 80 according to the invention. This camera comprises a rapid winder 81, a film speed setting wheel 82 and a winding back device 83 as it is known from modern cameras. The lens 84 of the camera 80 is arranged in a conventional manner, i.e. in the middle of the front side of the camera. However, a view finder is not illustrated in FIG. 13. Instead, an electrical flash tube 85 being arranged in the focal line of a parabolic reflector 86 is provided. Both, the flash tube 85 and the reflector 86 are surrounded by a translucent housing 87. The reflector 86 is movable about a horizontal axis by means of an adjusting wheel 88. In a projecting housing 89 batteries and electronic circuits are provided for supplying the flash tube 85 with electrical energy. The energy of the batteries can, of course, also be used for supplying a motor winder (not shown) or the arrangement as illustrated in FIG. 12 with energy.

Figure 14:
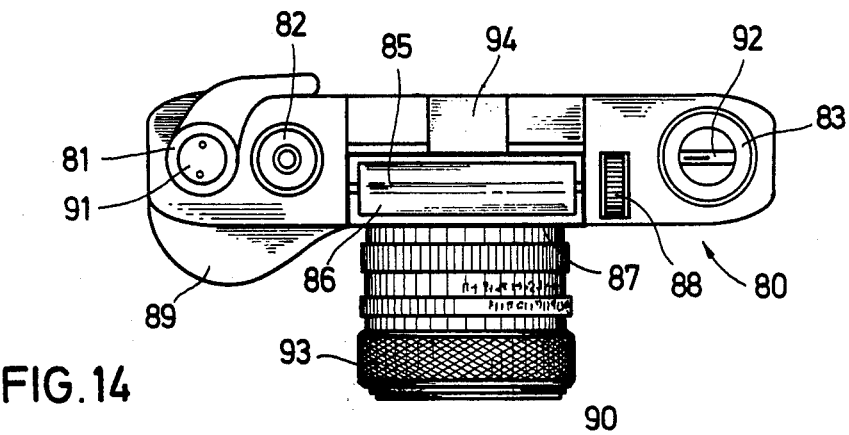
FIG. 14 is a top view of the camera as illustrated in FIG. 13.

FIG. 14 illustrates the camera of FIG. 13 from above. As can be seen from this figure, the rapid winder 81 comprises a shutter release knob 91 which can be pushed down. The winding back device 83 is provided with a lever 92 as it is common in modern cameras, and the objective 90 comprises a ring 93 for manually adjusting the range or the distance.

Contrary to the illustration of FIG. 13 the reflector 86 is turned upside in FIG. 14.

Figure 15:
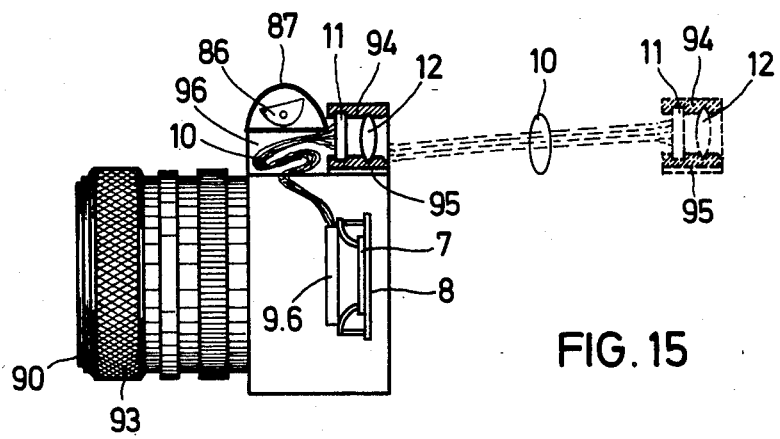
FIG. 15 is a sectional side view of the camera as illustrated in FIG. 14.

A slideably mounted view finder 94 is provided behind the housing 87, said view finder being shown in detail in FIG. 15 which is a sectional side view of the camera 80.

The view finder 98 mentioned above comprises a housing in which a scanning device or displaying screen 11 as well as an ocular 12 is provided. On the lower part of said housing guide bars 95 are arranged so as to make it possible to remove the view finder 94 from the camera 80. In an empty space 96 a bundle 10 of light conducting fibers or electrical leads is placed, said bundle being connected to the image receiving screen 9,6 and to the image displaying screen 11. The length of this cable 10 can be selected so as to enable a photographer to shoot from a place remote from the camera.

The dotted line illustration of FIG. 15 shows such an arrangement.

In FIG. 4 an image reproducing device was illustrated which uses three different kinds of elements. A similar device is described in U.S. Pat. No. 3,985,449. However, it is also possible to use only one photosensitive element and to make this element successively sensible for different colors by applying different bias voltages to the element. Another image scanning device comprising only one element for three different colors is described in German published patent application No. 28 11 961. By means of such a device which relates to burried channel charge coupled devices, the screen 9,73 can be simplified and, moreover, the resolution as well as the efficiency be improved. From the foregoing it is clear that the invention is not limited to a parallel transmission of information from the image receiving screen to the image displaying screen, but that also serial transmissions are subject of the invention. Such serial or time-multiplexing transmissions are common in the self-scanning CCD-technology.

For displaying the image to be photographed in the view finder, the displaying screen 11 can also be made of liquid crystals. Such screens of liquid crystals are well-known in the art (See: J. PÜTZ: Televisionen, Köln 1978, page 199, FIG. 7.1 or Japan Camera Trade News, December 1978, Vol. 29, No. 12, Series No. 34, page 25, left column).

The number of the picture elements of said screen is, for instance, 57 600 elements, whereby the power consumption is only 1.5 Watts.

Although the image sensing screen 9 is preferably connected to a curtain of a shutter so that it is arranged only temporarily between a film plane and a lens, it is also possible to arrange the screen permanently in this position. This can be achieved, for instance, by using a screen 9 made of translucent photosensitive elements e.g. very thin layers of semiconducting and conducting materials.

Figure 16:
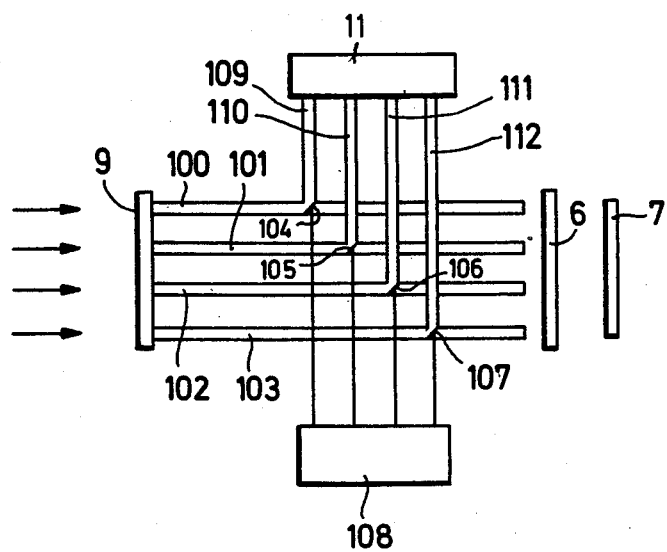
FIG. 16 is a diagrammatic illustration of a light-deflecting arrangement of glass fibers.

Moreover, a screen 9 comprising glass fibers can also be arranged permanently in that position. Such a screen 9 is illustrated in FIG. 16. The glass fibers 100–103 emerging from the screen 9 are led to the shutter 6, said fibers 100–103 comprising light-deflecting means 104–107 which are controlled by a controlling device 108. When these light-deflecting means 104–107 are supplied by a certain voltage, the light of the fibers 100–103 is deflected to the glass fibers 109–112 which, in turn, are connected to the image displaying screen 11. Thus, during the opening of the shutter 6 the controlling device 108 will not supply the deflectors 104–107 with voltage, i.e. a raster-like picture can be obtained on a film 7.

Figure 17:
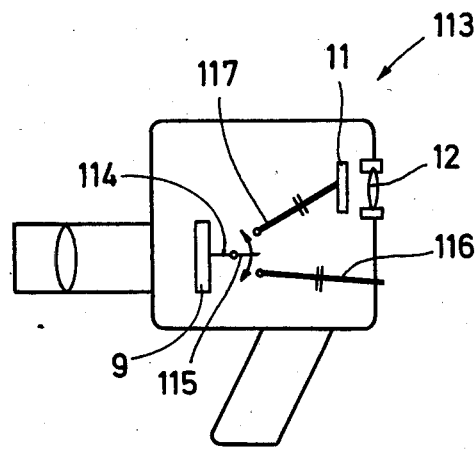
FIG. 17 is a video camera comprising a view finder according to the present invention.

A very simple application of the invention is shown in FIG. 17. This figure illustrates a video camera 113 comprising a solid state imaging device 9 (as, for example, described in IEEE Transactions on Electronic Devices, Vol. ED-18, No. 11, November 1971, page 992). The output 114 of this device 9 is connectable by means of a switch 115 to a cable 116 which may, in turn, be connected to a video recorder or a television set or the like. The same switch 115, however, also allows a connection between the device 9 and the image displaying or reproducing device 11. Thus, by time-sharing or time-multiplexing, i.e. by switching the switch very quickly back and forth, it is possible to obtain video signals for the cable 116 and to obtain a picture of the objects to be photographed. The switch 115 shown in FIG. 17 is, of course, a symbolic representation of electronic switching means or of fiber switching means well known in the art.

It also goes without saying that in the connections of one device to another, shown on the described drawings, amplifying and/or adapting means are provided, if necessary.

I claim:

1. A camera comprising:
   a picture-taking objective capable of reproducing objects to be photographed;
   a screen comprising a plurality of elements for receiving and separating an image from said objective into a plurality of image elements;
   a focal-plane shutter having a curtain connected with said screen;
   transmitting means for transmitting information from said screen to at least one viewfinder so as to display therein the picture seen by said objective; and
   at least one roll for winding said curtain of said focal-plane shutter, said roll comprising at least one slot for receiving said curtain and said screen, said transmitting means emerging from said roll and being connected to said viewfinder.

2. A camera as defined in claim 1 wherein said viewfinder includes a device for displaying the picture seen by the objective and an ocular in position opposite to said device, the distance between said ocular and said device being variable.

3. A camera, as defined in claim 2, wherein an adjusting wheel for moving the ocular relative to said device is provided, said adjusting wheel comprising markings the relative positions of which are indicative for a defined position, said defined position indicating the focus of the objective for which said ocular is adjusted.

4. A camera comprising:
   a camera housing;
   a picture-taking objective capable of reproducing objects to be photographed on a plane of a film;
   at least one viewfinder for viewing the objects to be photographed;
   at least one screen comprising a plurality of elements for separating an image into a plurality of image elements, said screen being at least temporarily located in a plane intermediate said objective and said film plane and in the axis of the light beam of the objective so as to receive information transmitted from said objective towards said film plane; and
   means for transmitting the information from said screen to said viewfinder to transmit thereto the picture seen by the objective.

5. A camera as defined in claim 4 wherein said image elements comprise a plurality of light-conducting fibers arranged so as to form a fiber optic sheet.

6. A camera, as defined in claim 4, wherein said screen is an integral part of at least one curtain of a focal-plane shutter.

7. A camera according to claim 4
   said plurality of elements of said screen comprising first ends of light-conducting fibers,
   said viewfinder comprising an imaging screen having a plurality of light-emitting elements, said light-emitting elements being the second ends of said light-conducting fibers.

8. A camera according to claim 4
   said plurality of elements of said screen comprising opto-electrical converters,
   said viewfinder comprising an imaging screen having a plurality of light-emitting elements, said light-emitting elements comprising electro-optical converters; and
   electrical conductors for connecting said opto-electrical converters to said electro-optical converters so that the viewfinder shows the picture seen by said objective.

9. A camera as defined in claim 4, said camera further comprising:
   a translucent casing arranged in said housing;
   a reflector turnably mounted in said translucent casing;
   a flash lamp arranged in said reflector; and
   means for turning said reflector in said transparent casing.

10. A camera comprising:
    a picture-taking objective capable of reproducing a plurality of elements to be photographed;
    at least one screen comprising a plurality of elements for separating an image into a plurality of image elements, said screen being arranged on a focal-plane shutter and positioned to receive information from said objective; and
    means for transmitting information from said screen to at least one viewfinder so as to display therein a picture seens by said objective.

11. A camera comprising:
    a picture-taking objective capable of reproducing objects to be photographed on a plane of a film;
    a shutter provided in a plane between the objective and the film plane;
    at least one screen comprising a plurality of elements for receiving and separating an image from the objective into a plurality of image elements, said screen being movable at least temporarily into a plane between the objective and the film plane without corresponding necessarily to the movement of the shutter, said screen plane being arranged in the axis of the light beam of the objective; and
    transmitting means for transmitting information from said screen to at least one viewfinder so as to display therein the picture seen by said objective.

* * * * *